Patented Feb. 27, 1951

2,543,250

UNITED STATES PATENT OFFICE 2,543,250

CONDIMENT

Walter A. Miller, Chicago, Ill., assignor to Wm. J. Stange Co., Chicago, Ill., a corporation of Illinois No Drawing. Application March 16, 1949, Serial No. 81,832

7 Claims. (Cl. 99—140)

My invention contemplates and provides a novel condiment for food products of the kinds and varieties which severally desirably include a plurality of blending seasoning agents of which ground or otherwise comminuted dehydrated onion is one and of which others are oleoresins and/or essential oils of spices.

Examples of the heat processed food products in which my new condiment suitably may be included are tomato catsup, chili sauce, liver sausage and other ground meat products; and examples of the spices affording oleoresins and/or essential oils which suitably may be incorporated in my new condiment are cloves, cinnamon, allspice, black pepper, red pepper, celery seed, marjoram, mace, cassia and thyme.

An object of my invention is to eliminate serious difficulties heretofore always encountered in the practical industrial use of comminuted dehydrated onion as a condiment.

Another object of my invention is to provide a substantially dry free-flowing condiment, suitable for incorporation in various and sundry food products, which consists only of organic seasoning agents, in contra-distinction to dry condiments heretofore known which have consisted of organic seasoning agents dispersed over edible vehicles or carriers, such as sugar or salt or soya flour, which have added greatly to the bulks of the condiments without making any significant contribution to their food seasoning effectiveness.

Another object of my invention is to provide a dry condiment consisting largely of comminuted dehydrated onion which does not form into cakes or become lumpy while awaiting use in non-arid atmospheres. The maintenance of arid atmospheres in food cooking establishments is almost invariably impossible.

My invention is predicated upon my discovery that comminuted dehydrated onion, which is very hygroscopic and therefore tends to form into cakes and otherwise become lumpy while exposed to the atmosphere and awaiting use, can be rendered substantially non-hygroscopic, and capable of so remaining for substantial periods of time even in the usually somewhat humid atmospheres of food cooking establishments, and withal a very satisfactory seasoning agent, if and when its particles are coated with oleoresins and/or essential oils of spices also desirable for introduction into the same food products. Heretofore food processors advisedly have been careful to keep other ingredients of food products out of contact with comminuted dehydrated onion prior to the incorporation of the latter into such products, because of the very hygroscopic character and consequent cake-forming and lump-forming propensities of the comminuted dehydrated onion.

The aforementioned and other objects, features and advantages of my invention will appear from the following detailed description of typical varieties of my new condiment and the presently preferred manner of making them.

In the production of my novel condiment, comminuted thoroughly dehydrated onion is placed into a power mixer before being afforded any opportunity to take unto itself any ambient moisture. This may be accomplished either by passing comminuted dehydrated onion directly from a dehydrator into the mixer, or preferably by maintaining the ambient atmosphere quite arid while thoroughly dehydrated onion is being comminuted, by grinding or otherwise, and while the comminuted dehydrated onion is being processed in the mixer. The proper quantities of appropriate oleoresins and/or essential oils of spices are now added to the mixer and the latter operated until each and every particle of the comminuted dehydrated onion has been accorded a very thin but complete coating of the oily and adherent, and usually somewhat viscous, solution resulting from the thorough intermixture of the added oleoresins and/or essential oils. The optimum mixing time will vary somewhat, depending upon the capacity of the mixer and the varieties and quantities of the added oleoresins and/or essential oils, but usually will be between twenty minutes and one hour. The resultant product, being my new condiment, is then packed for transportation to the food processing establishments where it is to be used.

When my new condiment is to be incorporated in tomato catsup, its constituents suitably may be substantially as follows:

Example A

| | Percent |
|---|---|
| Oleoresin of cloves | 2.65 |
| Oleoresin of cinnamon | 2.10 |
| Oleoresin of allspice | 1.20 |
| Oleoresin of black pepper | .90 |
| Oleoresin of red pepper (capsicum) | .30 |
| Oleoresin of celery seed | .55 |
| Comminuted dehydrated onion | 92.30 |
| | 100.00 | or as follows:

Example B

| | Percent |
|---|---|
| Oleoresin of cinnamon | 1.25 |
| Oleoresin of cloves | 2.00 |
| Oleoresin of celery seed | .75 |
| Oleoresin of red pepper (capsicum) | .31 |
| Oil of cloves | 1.00 |
| Oil of cassia | 1.70 |
| Cynnamic aldehyde | 1.50 |
| Comminuted dehydrated garlic | 5.75 |
| Comminuted dehydrated onion | 85.74 |
| | 100.00 |

When such condiment is to be incorporated in chili sauce its constituents suitably may be substantially as follows:

Example C

| | Percent |
|---|---|
| Oil of cloves | 1.40 |
| Oleoresin of red pepper (capsicum) | .90 |
| Oil of allspice | .75 |
| Oil of cinnamon | .60 |
| Oil of celery seed | .25 |
| Comminuted dehydrated onion | 96.10 |
| | 100.00 |

When such condiment is to be incorporated in chili sauce without pepper, its constituents suitably may be substantially as follows:

Example D

| | Percent |
|---|---|
| Oil of cloves | 1.40 |
| Oil of allspice | .75 |
| Oil of cinnamon | .60 |
| Oil of celery seed | .25 |
| Comminuted dehydrated onion | 97.00 |
| | 100.00 |

When such condiment is to be incorporated in liver sausage, its constituents suitably may be substantially as follows:

Example E

| | Percent |
|---|---|
| Oleoresin of black pepper | 5.00 |
| Oleoresin of marjoram | 1.60 |
| Oleoresin of cloves | 1.20 |
| Oleoresin of mace | .40 |
| Oleoresin of thyme | .20 |
| Comminuted dehydrated onion | 91.60 |
| | 100.00 |

The term "comminuted dehydrated onion," as used herein, contemplates dehydrated onion that has been reduced to relatively small discrete particles by any means or process whatsoever. It will be understood that in their practical uses the difference between the oleoresin and the essential oil of a given spice ofttimes is indistinct. Sometimes an oleoresin desirably contains or has added thereto some of the essential oil of the same spice, or vice-versa.

My herein described novel condiment, predicated as it is upon my hereinbefore-mentioned discovery, has solved a serious practical problem that for many years has confronted and hampered manufacturers of food products which for their proper seasoning have required that they have introduced into them substantial percentages of comminuted dehydrated onion—those problems being how to prevent the comminuted dehydrated onion from forming into cakes or becoming lumpy while awaiting use in un-sealed containers.

Having thus described my invention and a number of representative embodiments thereof, what I claim as new and desire to secure by Letters Patent of the United States, is:

1. A condiment which includes a major percentage of comminuted dehydrated onion and minor percentages of seasoning agent derivatives of spices, said seasoning agent derivatives of spices being selected from the group of such derivatives which consists of oleoresins and essential oils and being intermixed with each other and coating the several particles of the comminuted dehydrated onion, said condiment being characterized by its lack of tendency to cake or form lumps while awaiting use in a moisture-containing atmosphere.

2. A condiment according to claim 1 in which at least one of said seasoning agent derivatives of spices is an oleoresin.

3. A condiment according to claim 1 in which at least one of said seasoning agent derivatives of spices is an essential oil.

4. A condiment according to claim 1 in which the seasoning agent derivatives of spices are oleoresins.

5. A condiment according to claim 1 wherein the seasoning agent derivatives of spices are essential oils.

6. A condiment according to claim 1 wherein the seasoning agent derivatives of spices are oleoresins and essential oils.

7. A substantially non-hygroscopic condiment consisting only of organic seasoning agents, one of said seasoning agents being comminuted dehydrated onion, and others of said agents being derivatives of spices, the comminuted dehydrated onion being present in major percentage, and the spice derivatives being present in minor percentages and being intermixed and coating the several particles of the comminuted dehydrated onion.

WALTER A. MILLER.

REFERENCES CITED

The following references are of record in the file of this patent:

UNITED STATES PATENTS

| Number | Name | Date |
|---|---|---|
| Re. 13,495 | Houston | Dec. 10, 1912 |
| 1,038,334 | Fleck | Sept. 10, 1912 |
| 2,079,415 | Levinson | May 4, 1937 |
| 2,284,822 | Heller | June 2, 1942 |